United States Patent [19]

Sakayama et al.

[11] Patent Number: 5,677,773
[45] Date of Patent: Oct. 14, 1997

[54] FACSIMILE APPARATUS HAVING FILE TRANSFER MEANS

[75] Inventors: Takashi Sakayama; Yoshiaki Tezuka; Yoshihiro Maei, all of Saitama, Japan

[73] Assignee: Fuji Xerox Co., Ltd., Tokyo, Japan

[21] Appl. No.: 384,907

[22] Filed: Feb. 7, 1995

[30] Foreign Application Priority Data

Feb. 8, 1994 [JP] Japan .................. 6-034260

[51] Int. Cl.$^6$ .................................... H04N 1/21
[52] U.S. Cl. ................ 358/403; 358/438; 358/468
[58] Field of Search ................... 358/402–404, 358/444, 468, 442, 434–438; 395/164–166; 379/100

[56] References Cited

U.S. PATENT DOCUMENTS 5,268,770  12/1993  Yukino .
5,280,369   1/1994  Minamizawa .
5,339,169   8/1994  Meguro et al. ................ 358/404
5,528,383   6/1996  Tezuka et al. ................ 358/468

FOREIGN PATENT DOCUMENTS 2-134974  5/1990  Japan .
3-49463   3/1991  Japan .

*Primary Examiner*—Kim Vu
*Attorney, Agent, or Firm*—Finnegan, Henderson, Farabow, Garrett & Dunner, L.L.P.

[57] ABSTRACT

A present invention provides a facsimile apparatus having file transfer means which comprises receiving command signal preparation means for preparing a receiving command signal to provide information about image information transfer, and information value storing means for storing indication in advance which will be set in an indication bit of the receiving command signal, wherein the indication stored in advance can be set in the receiving command signal when a file transfer is carried out.

3 Claims, 10 Drawing Sheets

FACSIMILE APPARATUS HAVING FILE TRANSFER MEANS

BACKGROUND OF THE INVENTION

1. Field of the Invention

The present invention relates to a facsimile apparatus and in particular relates to a facsimile apparatus which is capable of transferring both image information and files utilizing a standard protocol for G3 mode.

2. Discussion of the Related Art

Methods of transferring files utilizing the procedure of transmitting image information have been disclosed by Japanese Patent Application Unexamined Publication Nos. Hei. 2-134974 and Hei. 3-49463. The former one carries out communication negotiation, by a non-standard protocol which can communicate for a file transfer only between machines of the same type, and the latter carries out communication negotiation by a protocol for G4 mode in order to carry out file transfer. That is, the file transfer methods disclosed by the above-mentioned publications could not transmit data utilizing a standard protocol for G3 mode.

Recently, a recommendation (ITU-T T.30) about G3 facsimile apparatus for document transfer having a file transfer function has been issued, whereby the inconveniences described above are resolved and it is expected that the file transfer utilizing the standard protocol for G3 mode will be widespread.

However, there has been the following problem in transferring files in accordance with the above recommendation.

A conventional facsimile apparatus has set indication in a digital command signal (referred to as DCS) based on indication from the operator or negotiation with a receiving side facsimile apparatus for transmitting image information. The receiving side facsimile apparatus has set a parameter for receiving in accordance with the indication of the DCS. The above indication necessary for receiving image information is not necessary for file transfer; therefore, in file transfer, no indication can be set because no indication are provided by the operator.

If no indication about image information transfer are set in the DCS, it is determined to be an error depending on the type of determination function of the receiving side facsimile apparatus. Therefore, supposing the case such as mentioned above, it is required to set indication for image information transfer even in the case of the file transfer.

Another case can be supposed in which a receiving side facsimile apparatus having relatively low determination function determines that setting in the DCS does not indicate the file transfer if any indication for image information transfer is set in the DCS.

Some of the indications for the image information transfer set in the DCS are unnecessarily set during the process of the file transfer. That is, in a conventional format of the DCS for providing indication about resolution information which shows the number of dots or lines per mm, coding system such as one-dimensional coding (referred to as MH) or two-dimensional coding (referred to as MR), width or length of recording sheet or the like, some indications are automatically provided for any setting of value.

As described above, it is necessary to set indication for image information transfer even in the file transfer, but there is a possibility that the setting is determined to be the image information transfer by the receiving side facsimile apparatus depending on its function, and files cannot be received, whereby obstacles to the file transfer are generated.

When the content of the file is image information but the file transfer indication is given, it is desired to provide appropriate indication so that the receiving side facsimile apparatus can carry out the receiving process for image information.

SUMMARY OF THE INVENTION

The present invention has been made in view of the above circumstances and has as an object the provision of a facsimile apparatus which is able to set indication for image information transfer in a DCS command so that no obstacles to the file transfer are generated.

A further object of the present invention is to provide a facsimile apparatus which holds an information value used for setting indication for the image information transfer in a receiving command signal when file transfer is performed.

Another object of the present invention is to provide a facsimile apparatus capable of setting a value which is ordinarily not planned to be used for providing indication for the image information transfer in a receiving command signal when the file transfer is performed.

The other object of the present invention is to provide a facsimile apparatus which is able to determine whether data content transmitted by the file transfer is image information, and, if it is image information, able to set indication appropriate to image information as the image information indication in a receiving command signal.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, a facsimile apparatus having file transfer means of this invention comprises receiving command signal preparation means for preparing a receiving command signal to provide information about image information transfer, and information value storing means for storing indication in advance which will be set in an indication bit of the receiving command signal, wherein the indication stored in advance can be set in the receiving command signal when a file transfer is carried out.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention. In the drawings.

DETAILED DESCRIPTION OF THE PREFERRED EMBODIMENT

Figure 2:
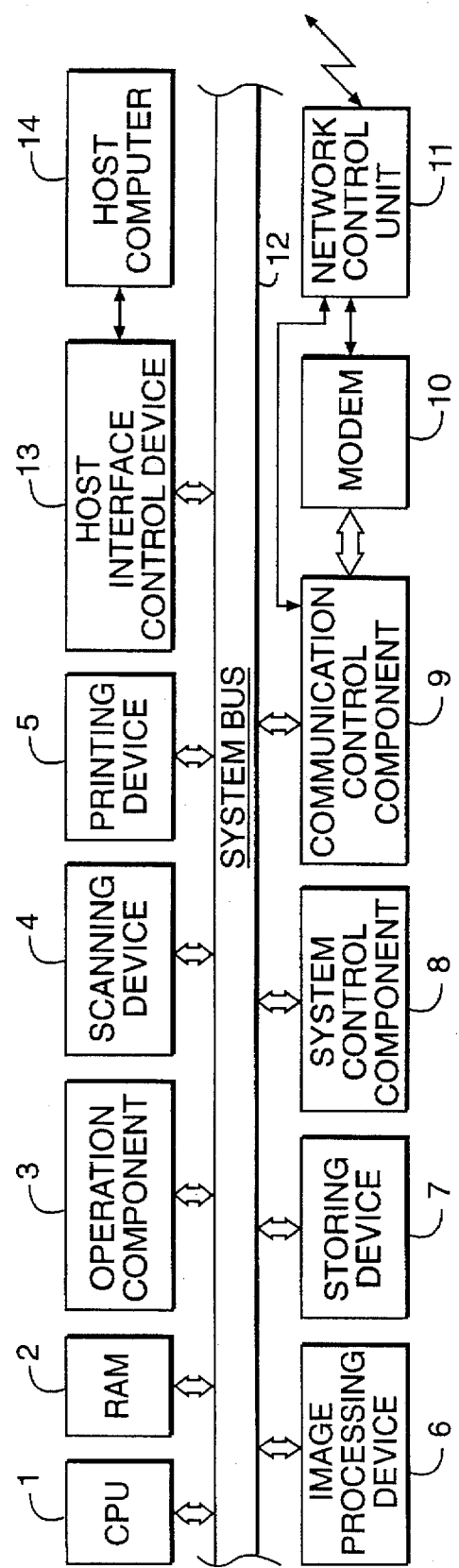
FIG. 2 is a block diagram showing a hardware construction of the embodiment of the facsimile apparatus according to the present invention.

Preferred embodiment of a facsimile apparatus according to the present invention is now described in detail based the drawings. FIG. 2 is a block diagram showing a hardware construction of an embodiment of facsimile apparatus of the present invention. In the figure, an operation component 3 comprises an input device including a keyboard or a mouse with which the operator inputs indication and a display device such as an LCD or CRT for displaying a process result based on the input or indication provided by the input. A scanning device 4 comprising a CCD or an optical system for reading documents to be transmitted. A printing device 5 records a received image or the like, which may be a laser printer, thermal recording device, and so forth.

A CPU 1 executes a predetermined program for the control process for the whole facsimile apparatus and the process according to facsimile transfer control protocol. A system control component 8 comprises a control program for the whole facsimile apparatus and a ROM which stores system data necessary for executing the program. A RAM 2 is a work area for executing the control program, which stores data to be temporarily stored, such as, control data. A storing device 7 is a large capacity memory for storing image information or files. A hard disk, floppy disk, CD-ROM or the like can be added to the storing device 7 as an auxiliary storing device. An image processing device 6 carries out coding and/or decoding of image information by a coding method such as MH, MR or T.6 coding (referred to as MMR).

A communication control component 9 is a ROM storing a control program used for communication control of facsimile apparatus of the G3 or G4 communication mode, or the like. A modem 10 is a modulation/demodulation device including an interface function which has a low-speed mode (for transmission protocol signal: V.21) and high-speed mode (for image information transmitting/receiving: V.27 ter, V.29, V.33 and V.17). A network control unit 11 has an automatic calling/called function and connects the facsimile apparatus to, for example, an analog or digital network. These constituents transmit and/or receive data or signals with each other through a system bus 12.

A host computer 14, such as a workstation or a personal computer, is connected to the facsimile apparatus through a host interface control device 13.

With the above hardware construction, the scanning device 4 reads the documents to be transmitted in accordance with the indication given by the operator which is input to the operation component 3, and the read documents are stored in the storing device 7. The storing device 7 stores not only the documents to be transmitted which have been read by the scanning device 4, but also files input to the host computer 14 or the operation component 3, or received image indication. In accordance with the instructions from the operation component 3, stored image information or the like is sent to the line through the modem 10 and the network control unit 11, and transmitted to a predetermined receiving side facsimile apparatus. Received image information or the like is recorded and output by the printing device 5, or transmitted to the host computer 14.

Figure 3:
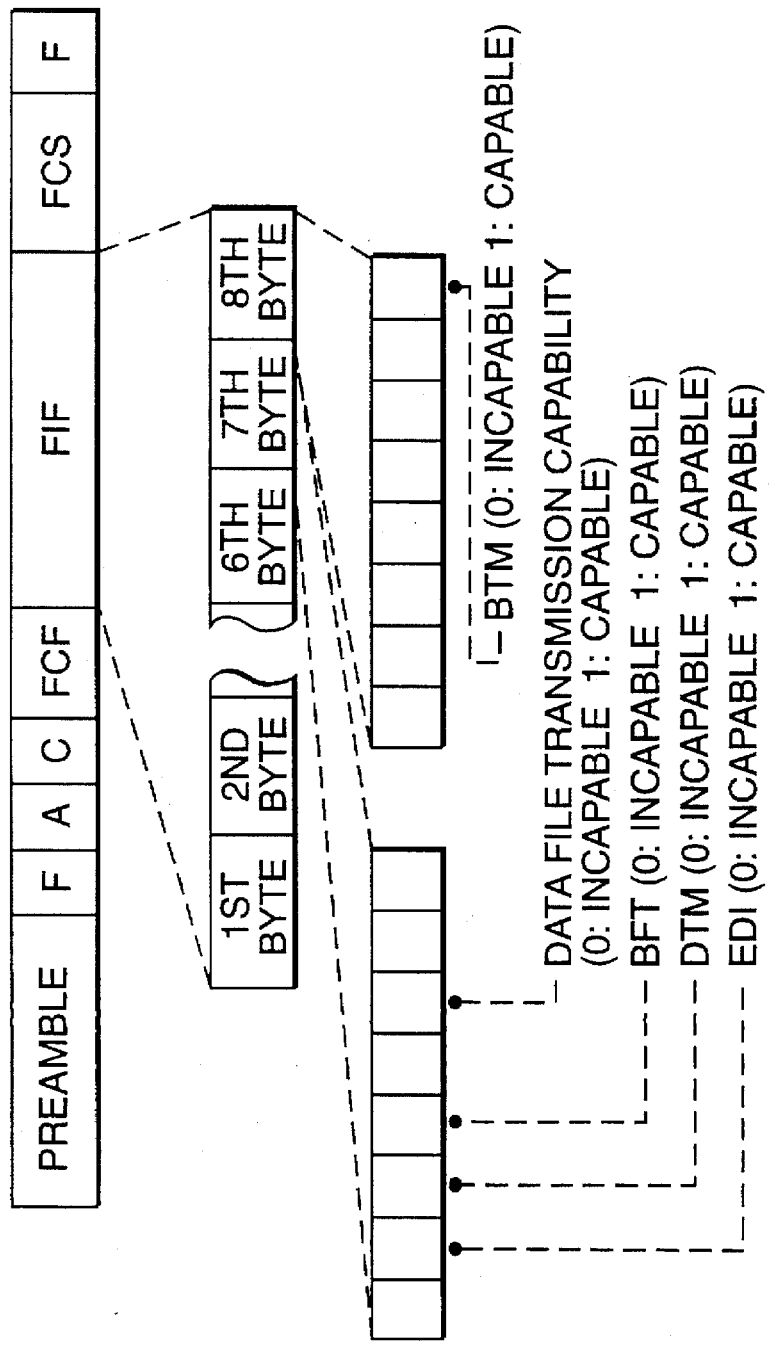
FIG. 3 shows a frame construction of a digital identification signal (DIS)
Figure 4:
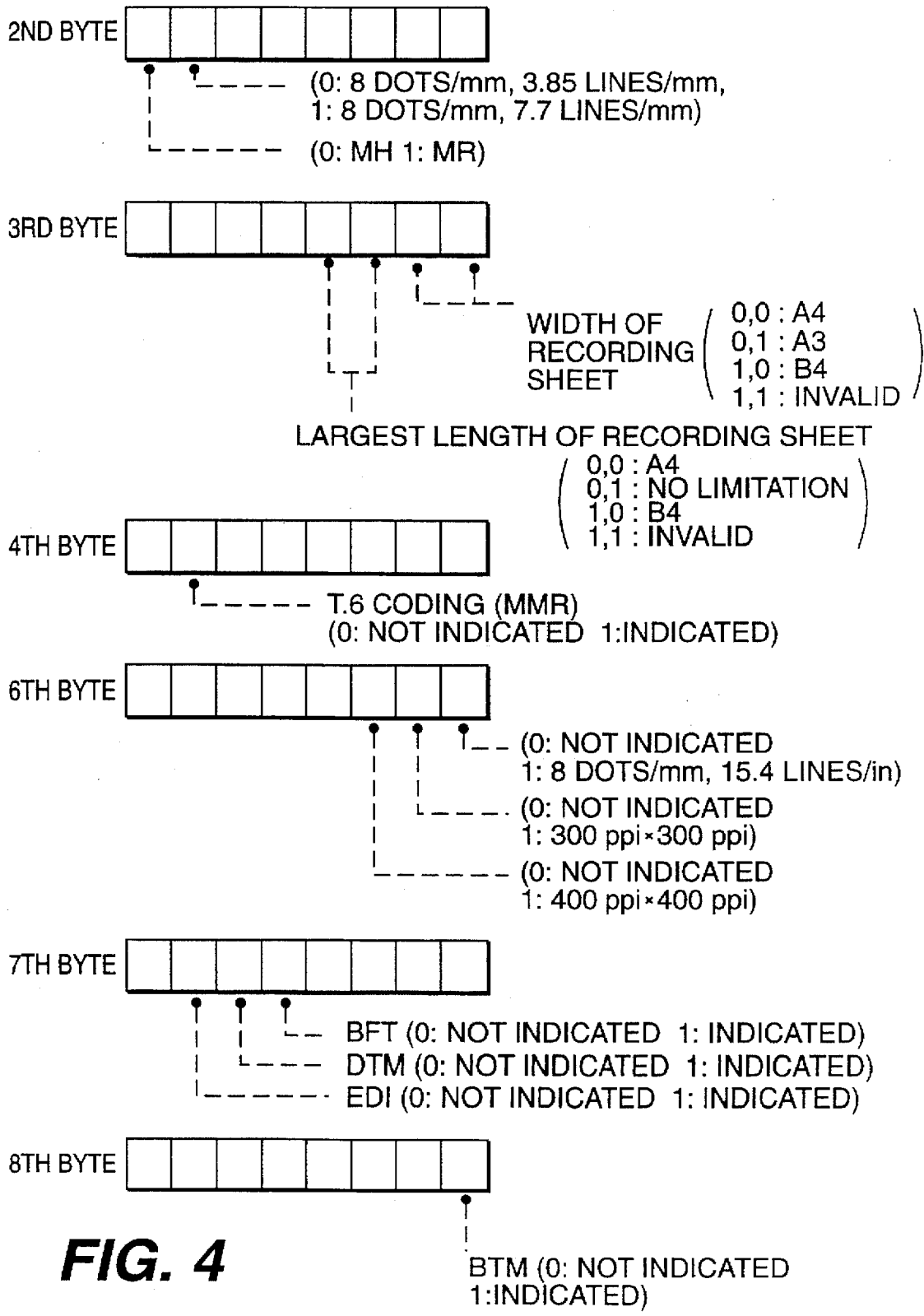
FIG. 4 shows a facsimile information field (FIF) of a digital command signal (DCS)

Next, a digital identify signal (referred to as DIS) and a digital command signal (referred to as DCS) are described in detail. FIG. 3 shows an example of the DIS, which is received from the receiving side facsimile apparatus, and FIG. 4 shows an example of the DCS, which is transmitted to the receiving side facsimile apparatus. The frame construction of the DCS is the same as that of the DIS; accordingly, only the contents of indication which can be set in each byte of a facsimile information field (FIF) are shown in the figure. In the DIS, capability/incapability of file transfer is described for every data type. Indication for the file transfer by every data type and indication for the image information transfer, namely, the resolution, the width and length of the recording sheet, the coding method and the like, are described in the DCS.

In FIGS. 3 and 4, BTM is an abbreviation of the basic transfer mode, which is a transfer mode for files of any kind (binary files, wordprocessor native format documents, bitmaps, etc.) without any additional information or file descriptions. A file description is an information regarding file name, data type and the like.

BFT is an abbreviation the binary file transfer, which is a file transfer mode for files of any kinds including the file description and additional information processed at the receiving side. DTM is the document transfer mode, which is a file transfer mode for files of any kind including the file description and additional information readable by the user. EDI means the EDIFACT file transfer, which is a file transfer mode for EDIFACT files coded according to ISO/IEC9735 rules.

Figure 5:
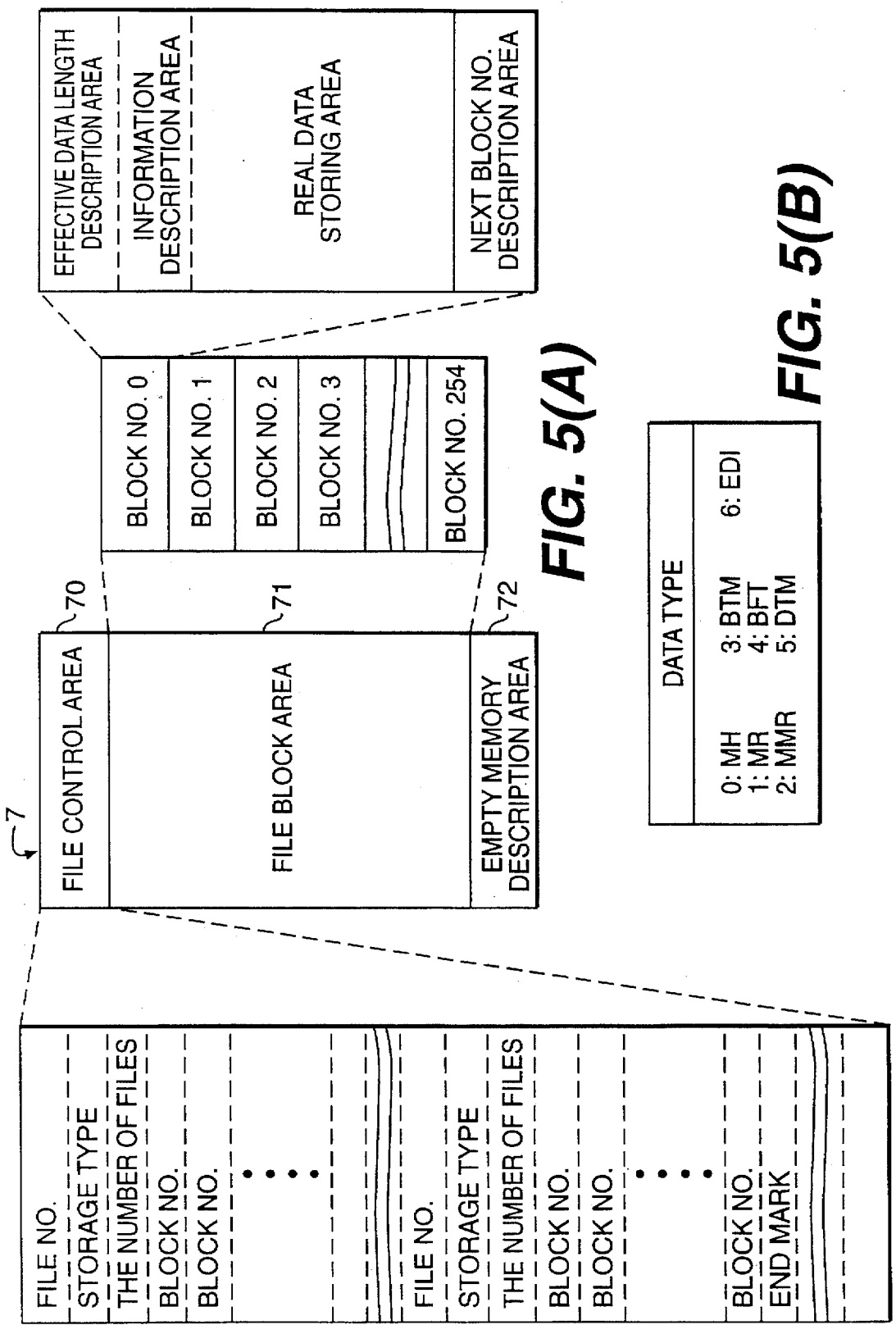
FIGS. 5(a) and 5(b) show a memory format of a storing device.
Figure 6:
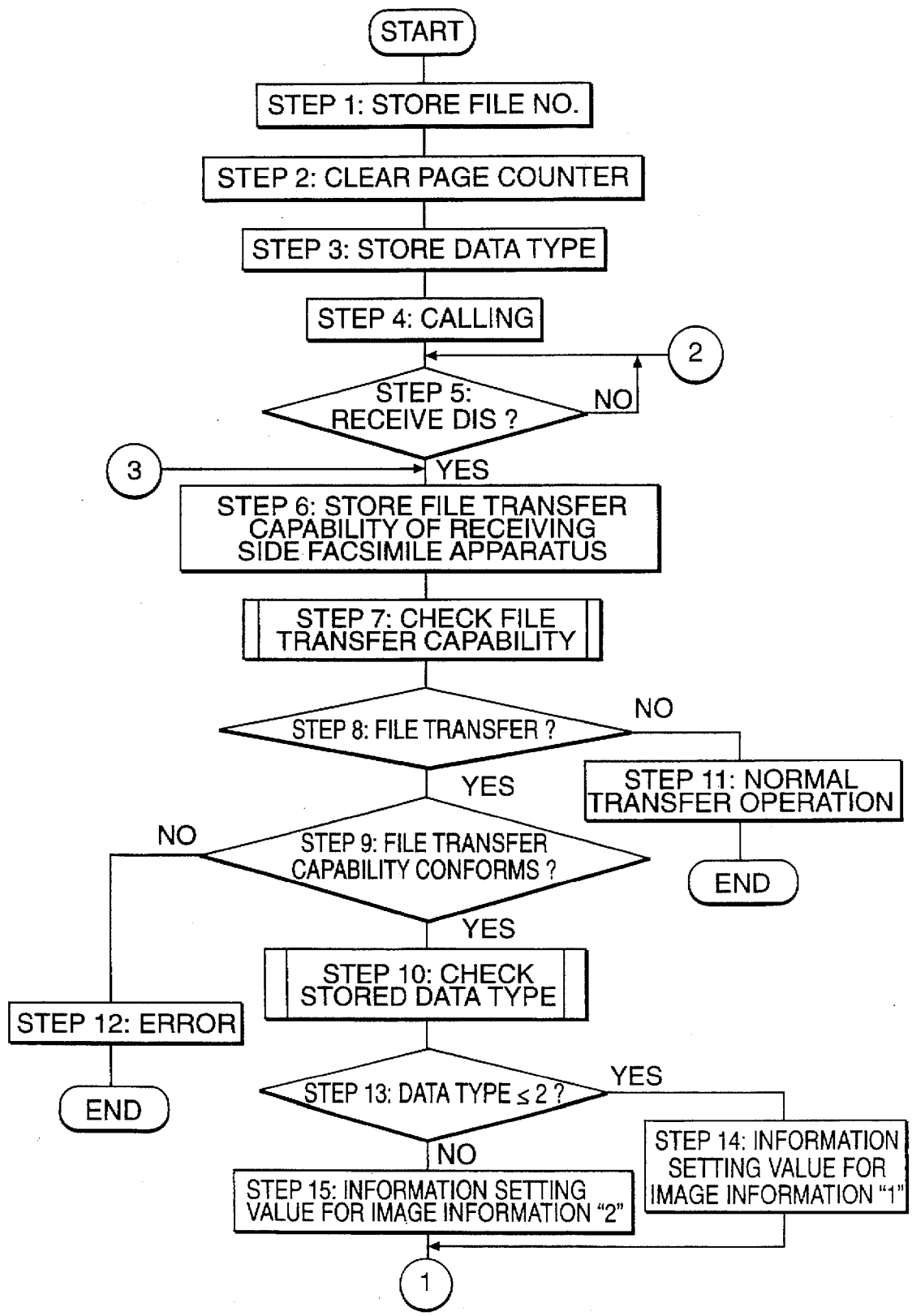
FIGS. 6 and 7 are flow charts showing an operation of data transmission.

A memory format of the storing device 7 is now described referring to a typical view of FIG. 5. In the figure, a file control area 70 which stores control information for the storing device 7, a file block area 71 which stores real data (real data means substantial data, that is, it is not management data) such as image information or files, and an empty memory description area 72 in which emptiness status in the file block area 71 is described, are prepared in the storing device 7.

As shown in the figure, the file control area 70 comprises file numbers, a storage type, the number of files, block numbers, an end mark, and so forth. The file number is assigned to every file for management by every communication unit. As the storage type, distinctions such as "transmission", "receiving" or "polling document" can be set. As the number of files, the number of files in one communication, namely, the number of pages can be set, and as the block number, an identification number for a block constituting each file are set.

The file block area 71 is divided into the predetermined number of blocks (for example, 254 blocks). Each block comprises an effective data length description area for describing information showing the number of data stored in the block, an information description area for describing information regarding stored data, for example, a data type, sheet size or a line density, a real data storing area for storing the real data, and an area describing the block number of the next block.

Correspondence between the value described in the information description area and the data type is shown in FIG. 5(b). In the figure, values 0, 1 and 2 indicate that the data type is image information, and are set corresponding to each of the coding systems. Values 3, 4, 5 and 6 represent that the data type is file, and are set corresponding to each of the file transfer modes. Detail of each file transfer mode will be described later.

In the empty memory description area 72, information as to whether the real data storing area is empty or in use is set in every block. For example, in the case of "empty", 0 is set, and in the case of "in use", 1 is set, whereby the state of block can be represented.

Next, the operation of the present embodiment is described based on the flow charts in FIGS. 6-10. In step 1 of FIG. 6, the file number included in the data input to the operation component 3 is stored in the RAM 2. In step 2, a page counter which shows the number of transmitted pages is cleared. In step 3, information about indication as to whether the data type input to the operation component 3 is the file transfer or the image information transfer is stored in a transmission type storing component in the RAM 2. In step 4, calling operation is carried out in accordance with the indication input to the operation component 3. Receiving of the DIS from the receiving side facsimile apparatus is awaited in step 5, and if received, the process proceeds to step 6 and the DIS is analyzed for storing the file transfer capability of the receiving side facsimile apparatus notified by the DIS. For example, a receiving side facsimile apparatus capability, storing component which stores the capability of the receiving side facsimile apparatus can be set in the RAM 2, wherein "capable" or "incapable" for each data type is described.

The type of data to be transmitted stored in the storing device 7 and the file transfer capability of the receiving side facsimile apparatus are checked in step 7. This process is now described in detail based on FIGS. 8 and 9. In step 8, it is determined whether the type of the indication for transmission is the image information transfer or the file transfer on the basis of the memory information in step 3. If it is the file transfer, the process proceeds to step 9, and it is then determined whether the file transfer capability of the receiving side facsimile apparatus conforms with the type of the data to be transmitted, which is also carried out based on the result of the process shown in FIGS. 8 and 9.

If the file transfer capability conforms with the data type, the process proceeds to step 10 and the stored data type is checked to determine whether the contents of the file are image information or not. That is, since there is a possibility of transmitting image information by the method of file transfer, check of the contents of the stored data is carried out to make preparations for the subsequent processes.

The check of the stored data type can be carried out by searching the information description area of the storing device 7, in the same way as the check of the file transfer capability. Moreover, the check of the stored data can also be performed based on the data type obtained by the check of the file transfer capability, that is, the data type stored in a register for the check of the file transfer capability is maintained to be utilized. After the data type checking is completed, a value of the register is described in a data type storing component in the RAM 2.

If a negative result is provided by determination in step 8, the process proceeds to step 11 and a normal transmission operation procedure for the image information transfer is carried out. In the case where the file transfer capability does not conform with the data type of the transmission data, a negative determination is provided in step 9, and the process proceeds to step 12 for displaying an error indication in the display device of the operation component 3.

In step 13, distinction of stored data types between. image information and files is made depending on whether the value of the register is 2 or less, or not. If the-value of the register is 2 or less, the stored data type is determined to be image information in accordance with the correspondence shown in FIG. 5(b) (2=MMR, 1=MR, 0=MH). If the value of the register is 3 or more, the stored data type is determined to be files in accordance with the correspondence shown in FIG. 5(b) (3=BTM, 4=BFT, 5=DTM, 6=EDT). If the data type is determined to be files, the process proceeds to step 14, and an indication setting process for the DCS (information setting value for image information "1") is carried out. If the data type is image information, the process proceeds to step 15 and the indication setting process (information setting value for image information "2") is performed.

With the information setting value for image information "1", the resolution, the coding method and information values regarding, for example, width and length of the recording sheet which have been stored in the RAM 2 are read out, and are set in a predetermined byte in the facsimile information field (FIF) of the DCS according to the format shown in FIG. 4. The information value about image information does not shows indication related to files; therefore any indication can be set by the provision of the information value. That is, an arbitrary value can be set as the information value.

Moreover, with the information setting value for image information "1", the information value can be inconsistent indication: for example, all of the bits for giving indication for different resolutions can be set to "1", the bits for giving indication for both the MR and the MMR can be set to "1", and the bits for giving indication for width and length of the recording sheet can be set to "1, 1", which means invalidity.

One of the above information setting values for image information "1", the arbitrary information value and the inconsistent information value, should be selected on the basis of the construction and function of the receiving side facsimile apparatus. That is, in the case where most of the receiving side facsimile apparatuses have constructions determining a consistent value as information about image information to be indication for image information receiving without exception, the information value should be the inconsistent value. On the other hand, in the case where most of the receiving side facsimile apparatuses have construction which is able to receive transferred files though consistent setting of information about image information is a prerequisite for receiving, the information value as the information about image information should be set consistently.

With the information setting value for image information "2", the coding method, the size of the recording sheet, information of the resolution, and so forth, regarding stored image information are read out from the information description area of the storing device 7 and setting the FIF of the DCS is carried out in accordance with the information.

Figure 7:
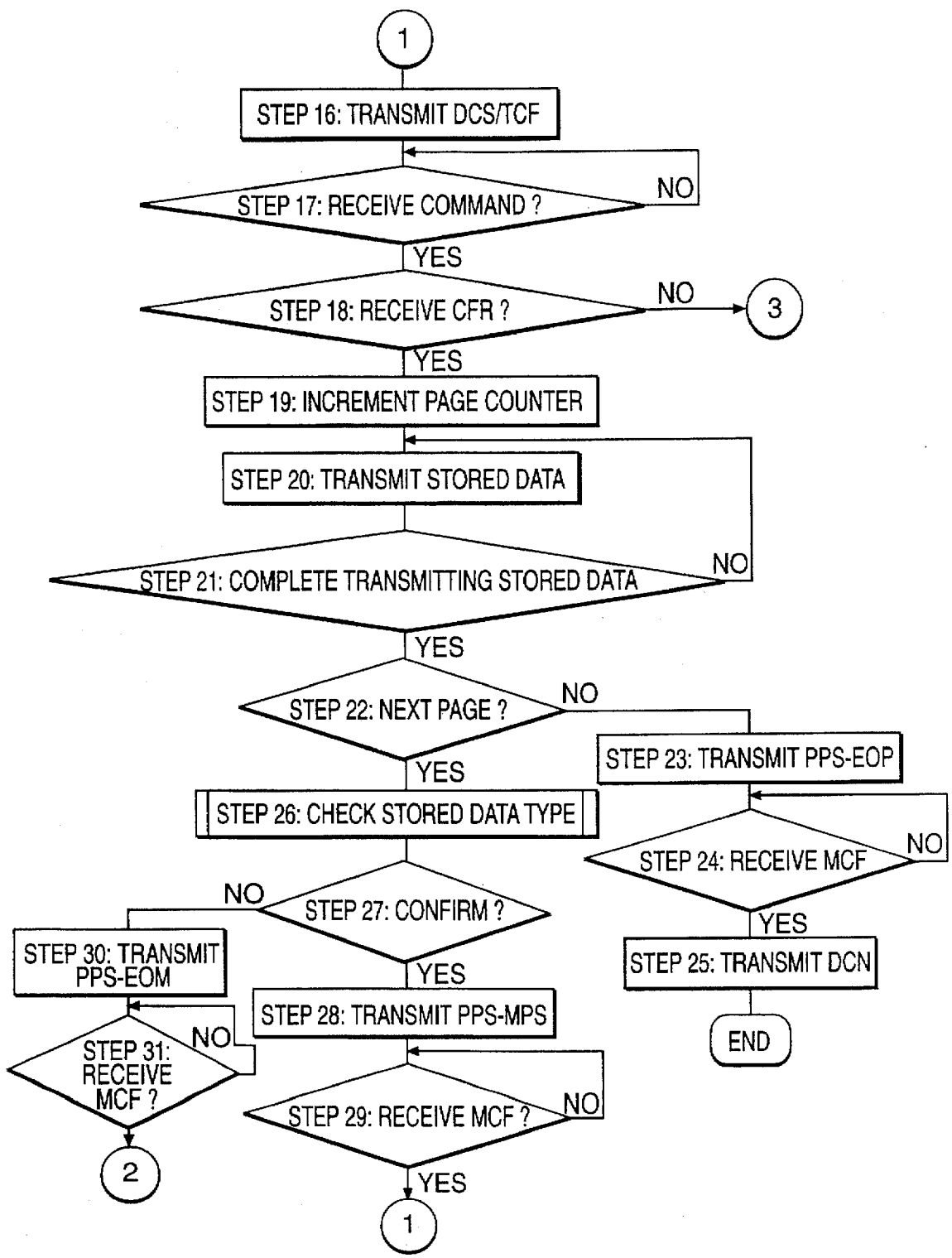

The process proceeds to step 16 of FIG. 7. The DCS and a training check (referred to as TCF) signal in which the information setting value for image information "1" or "2" has been set are transmitted to the line. Step 17 is a process of waiting for receiving a response command from the receiving side facsimile apparatus. If the response command is received, the process proceeds to step 18, where it is determined whether the received command is a confirmation to receive (referred to as CFR) signal. If the CFR signal is received, the process proceeds to the step 19 where the page counter is incremented. In step 20, the stored data is transmitted to the line. In step 21, if the transmission of the stored data is determined to be completed, the process proceeds to step 22 to determine whether there is a next page. The determination is made by comparison between the value of the page counter showing the number of pages which have already been transmitted and the number of files described in the file control area 70. If it is determined that the next page does not exist, the process proceeds to step 23 and a partial page signal-end of procedure (referred to as PPS-EOP) is transmitted. If a message confirmation (referred to as MCF) signal is received in step 24, the process proceeds to step 25 and a disconnect (referred to as DCN) signal is transmitted to complete the process.

If it is determined that there is a next page in step 22, the process proceeds to step 26 and the stored data type is checked. The detail of the check will be described later based on FIG. 10.

In step 27, it is determined whether the data type of the next page conforms with that of the preceding page. If the data types conform with each other, the process proceeds to step 28 and a partial page signal-multi page signal (referred to as PPS-MPS) is transmitted. Further, if the MCF signal is received in step 29, the process returns to step 16. If the data type of the next page does not conform with that of the preceding page, the process proceeds to step 30 and a partial page signal-end of message (referred to as PPS-EOM) is transmitted. Further, if the MCF signal is received in step 31, the process returns to step 5 of FIG. 6.

Figure 8:
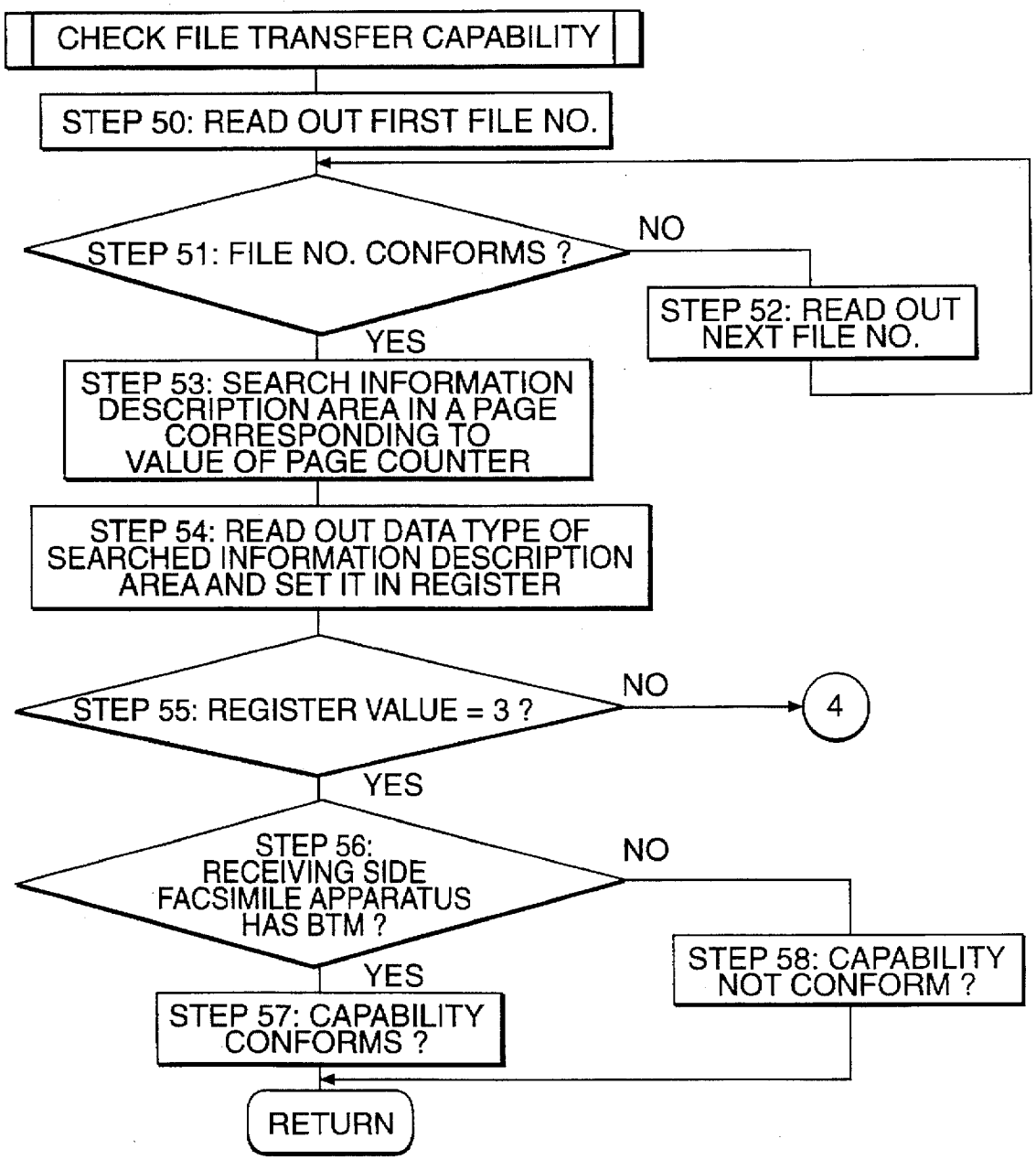
FIGS. 8 and 9 are flow charts showing an operation of check of file transfer capability.
Figure 9:
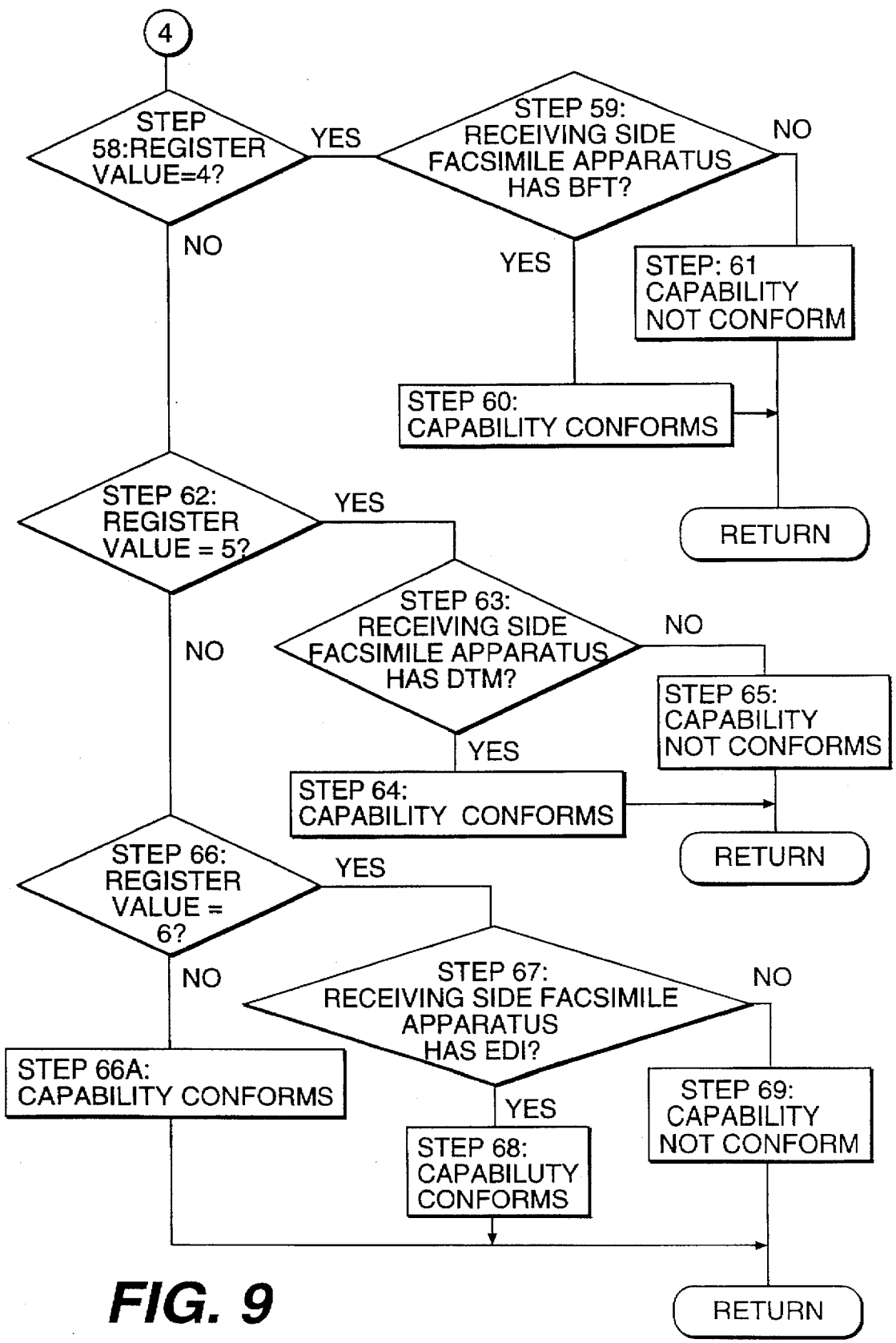

Next, detail of the check of the file transfer is described based on FIGS. 8 and 9. In step 50, a first file number is read out of a top address. In step 51, it is determined whether the file number which has been read out conforms to the file number to be transmitted namely, the file number specified in step 1. If these file numbers do not conform to each other, the process proceeds to step 52 to read out the next file number, and then conformance between the file number which has been read out and specified file number is again checked in step 51.

If the file numbers conform to each other, the process proceeds to step 53, wherein the information description area in a page corresponding to the value of the page counter is searched. In the first page, for example, the information description area of the block having the block number "0" is searched. In step 54, the data type of the searched information description area is read out and loaded to the register.

In step 55, a determination as to whether the value of the register is 3 or not. The register value 3 represents that the data type is file according to the correspondence shown in FIG. 5(b), which means that the file transfer mode is the BTM; therefore, in step 56, it is determined whether the receiving side facsimile apparatus has the capabilities including the BTM. If the receiving side facsimile apparatus has the capability of the BTM, the process proceeds to step 57 to describe the information showing "capability conform" in a memory area prepared in the RAM 2. In the case where the receiving side facsimile apparatus does not have the capability of the BTM, the process proceeds to step 58 and "capability not conform" is stored. In a similar way, conformance with the capability of the receiving side facsimile apparatus is checked and the result is stored in steps 58 through 69 (in FIG. 9). The capability conformance determination result obtained here is utilized as a base of determination in step 59. In the case where the value of the register is not any of 3, 4, 5 and 6, the information "capability conform" is stored without determining conformance with the capability of the receiving side facsimile apparatus (in step 66a).

Figure 10:
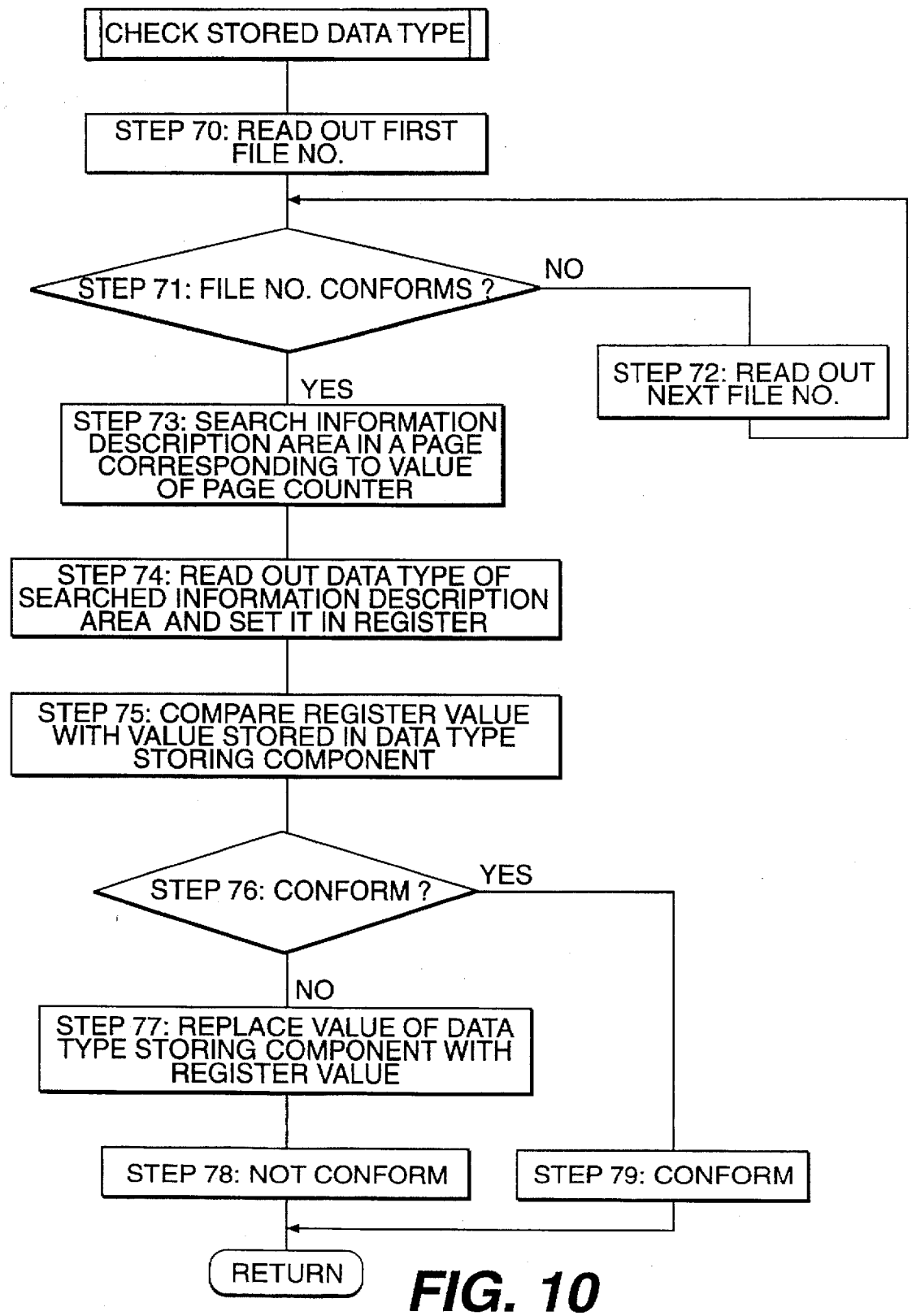
FIG. 10 is a flow chart showing an operation of check of stored data type.

Next, check of the stored data type is described based on FIG. 10. In the figure, steps 70 to 74 correspond to steps 50 to 54 of FIG. 8; therefore explanation for these steps is omitted. In step 75, data type of the preceding page stored in the data type storing component is compared with the value of the register, namely, the data type of the next page. In step 76, whether the data types of these two pages conform with each other is determined based on the result of the comparison. If they do not conform to each other, the process proceeds to step 77 and the value of the data type storing component is replaced with the value of the register, and moreover, the process proceeds to step 78 to describe the information showing "not conform" in a storage area prepared in the RAM 2. In the case where the data types conform with each other, the process proceeds to step 79 to store the information showing "conform". The result "conform" or "not conform" is utilized in determination in step 27.

Figure 1:
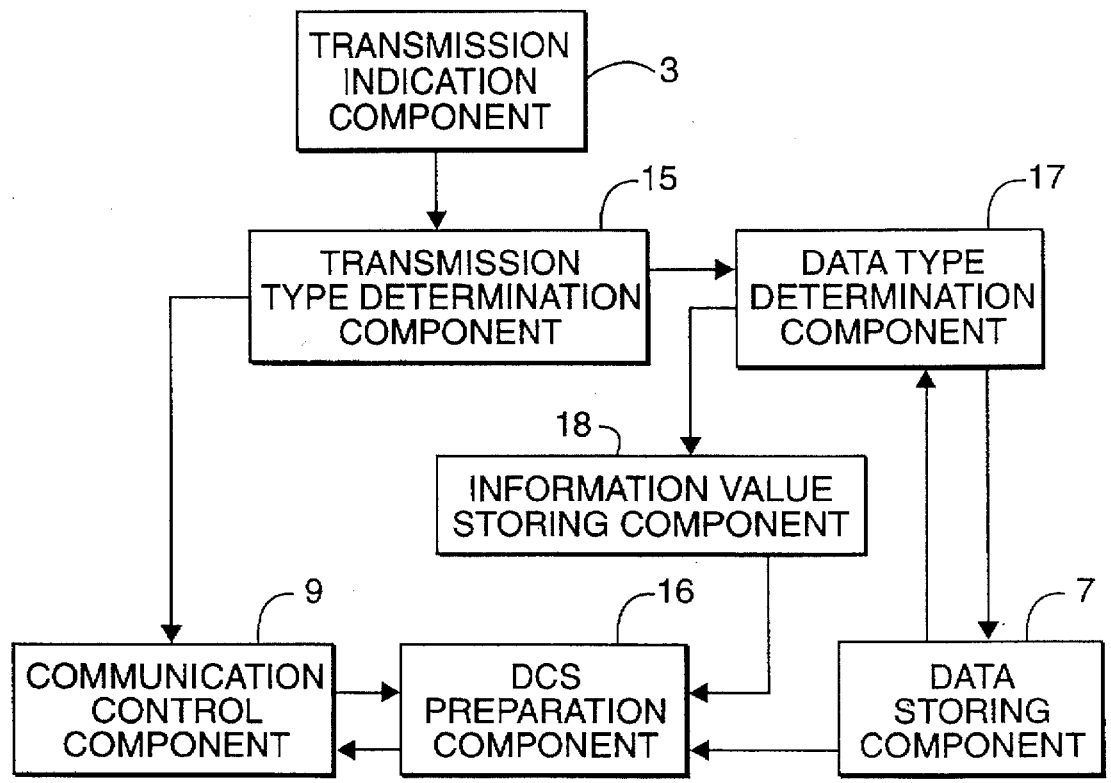
FIG. 1 is a block diagram showing functions of main components of an embodiment of facsimile apparatus according to the present invention.

The functions of the main components of this embodiment are now described based on the block diagram in FIG. 1. In the figure, image information and files as the transmission data are managed with the file number and stored in a data storing component (storing device) 7. Together with the indication for transmission, type of the transmission and the file number are input to a transmission indication component (operation component) 3. A transmission type determination component 15 determines whether the transmission type of the provided indication is image information transfer or file transfer. If it is image information transfer, a communication control component 9 is started to carry out negotiation for a normal image information transfer. Based on the result of the negotiation, the DCS is prepared in a DCS preparation component 16.

In the case where the transmission type is the file transfer, a data type determination component 17 carries out the determination of the data type. The information value for providing indication for the image information transfer to be set in the DCS is stored in a information storing component 18. The contents of the information value has been previously described. If the data type is determined to be the file in the data type determination component 17, the stored data is read out from the information value storing component 18, and output to the DCS preparation component 16. The DCS preparation component 16 prepares the DCS based on the provided information value or the like, and transmit it to the line through a communication component 9.

As described above, in the file transfer, this embodiment can set the indication for the image information transfer in the DCS based on the information value. If necessary, the information value may be an inconsistent value as the indication. Moreover, even if the transmission type is the file transfer, the indication for the image information can be set in the DCS in the case where the content of the file is image information.

As it is clear from the above description, according to the first aspect of the embodiment, the information value can be set as the information about the image information transfer in the DCS, whereby it can be prevented that the receiving side facsimile apparatus provides the determination of an error for the reason that no indication for the image information is provided.

According to the second aspect of the embodiment, because it is possible to set a value, which is ordinarily cannot be set as the indication for the image information transfer, as information indicating the image information transfer of the DCS, the receiving side facsimile apparatus detecting the DCS can be notified that the transmission data is not image information.

Furthermore, in the case where the content of the file to be transferred by the file transfer is the image information, the indication appropriate to the image information can be set in the DGS according to the third aspect of the embodiment. As a result, the receiving side can be informed of the content of the file by the DCS.

The foregoing description of preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A facsimile apparatus for transferring file information and image information, comprising:

receiving command signal preparation means for preparing a command signal for sending to a receiving facsimile apparatus to provide information about transfer of the image information; and information value storing means for storing an indication of a file transfer mode to be set in an indication bit of said command signal, wherein said indication of file transfer mode stored in the information value storing means being set in said command signal when a file transfer is carried out.

2. The facsimile apparatus according to claim 1, wherein indication to be stored in said information value storing means are not ordinarily used in an image information transfer.

3. A facsimile apparatus for transferring file data and image data comprising:

data storing means for storing data to be transmitted;

receiving command signal preparation means for preparing a received command signal to provide an indication of a transfer mode for an image information transfer; and data type determination means for determining whether the data to be transmitted is file data or image data, wherein if the type of said data to be transmitted in a file transfer is determined to be image data, a parameter related to said image data stored with said image data being set as a command signal.

* * * * *